April 18, 1967     H. L. GRAHAM     3,314,575
SEED DISPENSING APPARATUS

Filed Feb. 23, 1965     3 Sheets-Sheet 1

Herbert L. Graham
INVENTOR.

BY Clarence A. O'Brien
and Harvey B. Jacobson
Attorneys

April 18, 1967     H. L. GRAHAM     3,314,575
SEED DISPENSING APPARATUS

Herbert L. Graham
INVENTOR.

April 18, 1967     H. L. GRAHAM     3,314,575
SEED DISPENSING APPARATUS
Filed Feb. 23, 1965     3 Sheets-Sheet 3
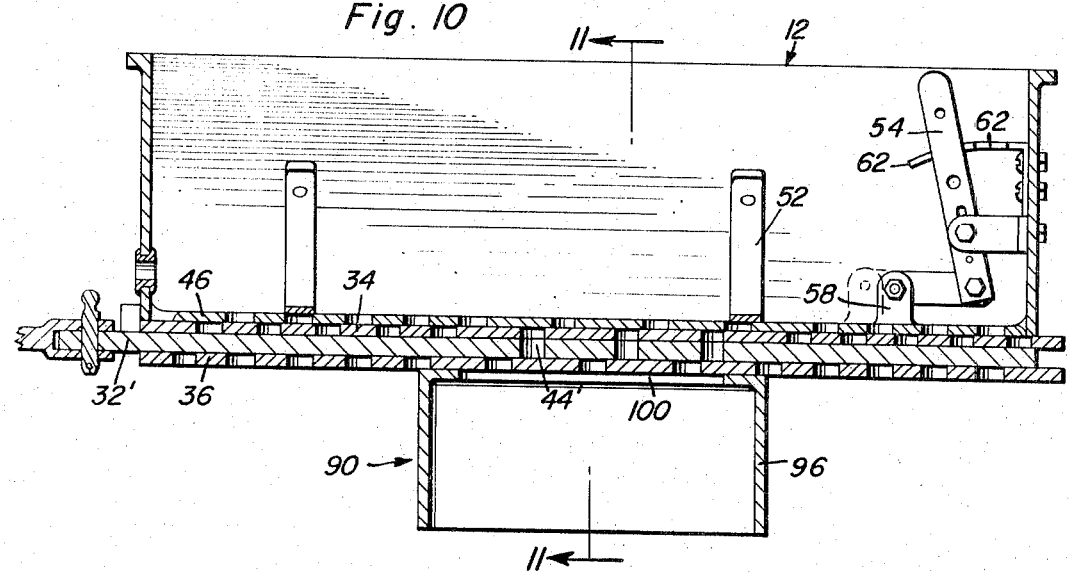
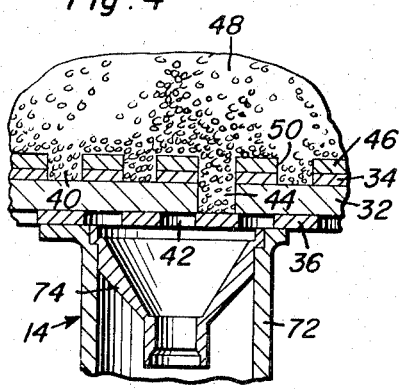
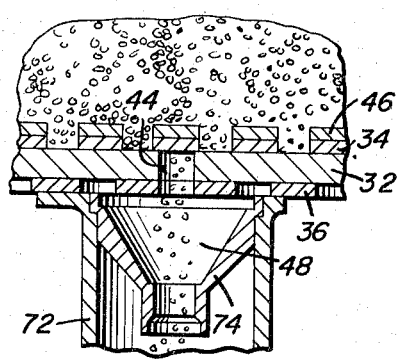
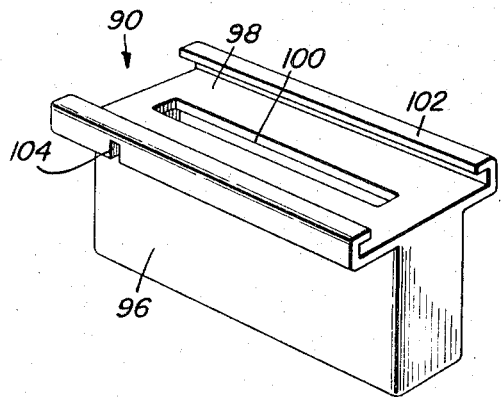
Herbert L. Graham
INVENTOR.

3,314,575
SEED DISPENSING APPARATUS
Herbert L. Graham, Corpus Christi, Tex., assignor to Clayton Specialties, Inc., a corporation of Texas
Filed Feb. 23, 1965, Ser. No. 434,571
11 Claims. (Cl. 222—330)

This invention relates to an apparatus for dispensing metered quantities of particulate material and more particularly to the deposit of seeds on bakery products.

It is therefore a primary object of the present invention to provide apparatus whereby materials such as poppy seeds, sesame seeds, cracked wheat or cornmeal may be deposited in proper quantities and in a desired pattern onto bakery products while being prepared for baking. The apparatus of the present invention is especially useful in connection with products being conveyed therebelow and is therefore suitable for being automatically controlled in order to intermittently deposit particulate material onto bakery products such as hamburger rolls or bread prior to baking.

An additional object of the present invention is to provide a seed dispensing device capable of simultaneously dispensing metered quantities of seed from spaced outlet locations with facilities for accommodating different types of bakery products involving different dimensional and locational requirements.

A still further object of the present invention is to provide a seed dispensing device which features one or more diverter sections adapted to be latched in adjusted positions as required. The seed dispensing device therefore, is also provided with a closing mechanism whereby changes may be made in the type and spacing of the diverter sections without dismantling the device or emptying the seed storing hopper from which the seeds are dispensed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged partial sectional view of a portion of the apparatus shown in FIGURE 3 in another operative condition.

FIGURE 5 is an enlarged partial sectional view similar to FIGURE 4 but showing the apparatus in another operational phase.

FIGURE 10 is a longitudinal sectional view of the seed dispensing apparatus similar to FIGURE 3 but showing another form of diverter associated therewith.

FIGURE 12 is a perspective view of the diverter illustrated in FIGURES 10 and 11.

Figure 1:
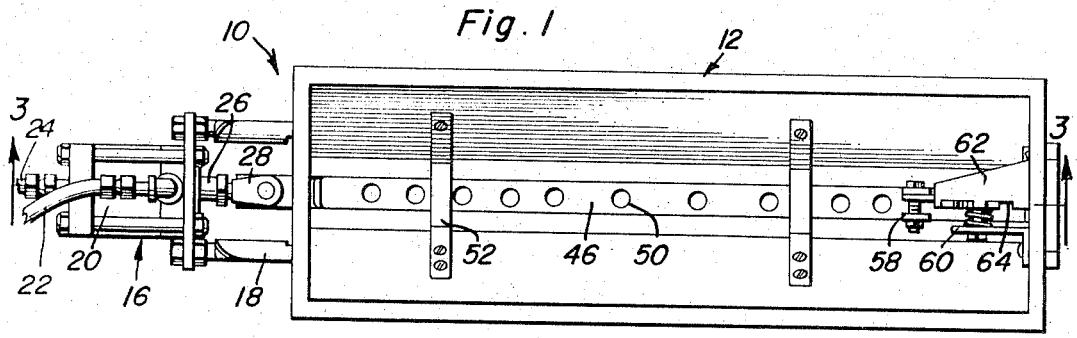
FIGURE 1 is a top plan view of the seed dispensing device of the present invention.
Figure 2:
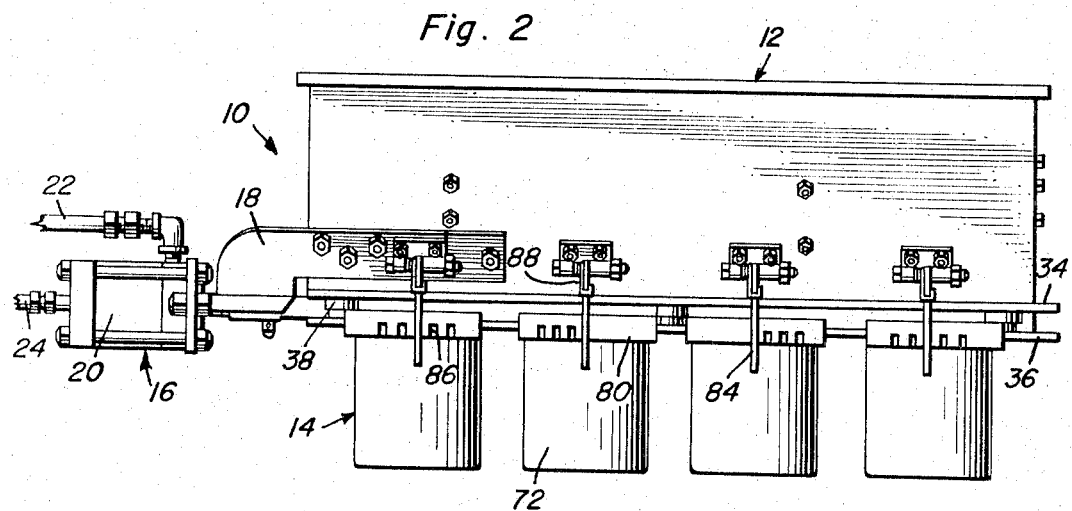
FIGURE 2 is a side elevational view of the seed dispensing device.

Referring now to the drawings in detail, and initially to FIGURES 1 and 2, the seed dispensing apparatus of the present invention is generally denoted by reference numeral 10. The dispensing apparatus is adapted to be mounted above a moving conveyor on which bakery pans are conveyed containing dough onto which the seed is to be deposited. The seed is therefore stored in a horizontally elongated hopper 12 which is disposed transversely across the conveyor perpendicular to the direction of movement so that the seeds may be simultaneously deposited on a plurality of bakery products being conveyed thereunder. Therefore, as shown in FIGURE 2, a plurality of diverter sections 14 are mounted below the hopper 12 so that metered quantities of seeds may be dispensed from spaced outlet locations for deposit onto four bakery products at one time. The dispensing operation may therefore be effected either manually or automatically when the bakery products are in position below the dispensing apparatus and toward this latter end, an operating mechanism 16 is provided at one longitudinal end of the hopper 12. A pair of mounting brackets 18 are therefore secured to the sides of the hopper and project therefrom in order to support an actuating cylinder device 20 to which fluid pressure lines 22 and 24 are connected in order to produce reciprocatory movement of the piston rod 26. The piston rod undergoes a relatively short reciprocatory stroke in order to operate the dispensing apparatus and is connected by means of the hitch element 28 to the metering mechanism associated with the seed dispensing apparatus.

Figure 3:
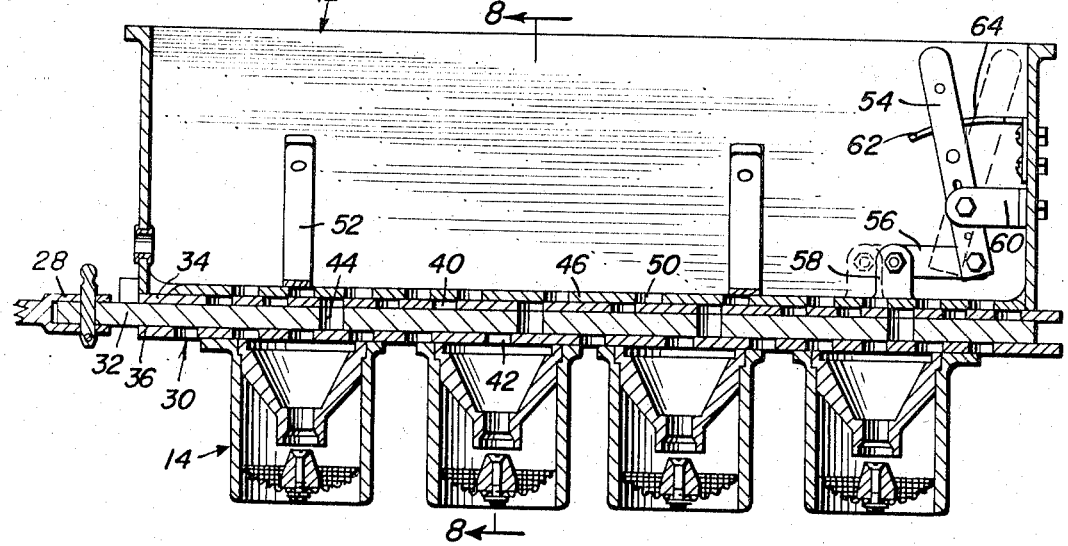
FIGURE 3 is a longitudinal sectional view taken substantially through a plane indicated by section line 3—3 in FIGURE 1.

Referring now to FIGURE 3 in particular, it will be observed that the metering mechanism generally referred to by reference numeral 30, includes a reciprocating shuttle bar member 32 to which the piston rod is connected by the hitch 28. It will of course be appreciated, that other operating facilities could be provided for reciprocating the shuttle bar. The shuttle bar is slidably mounted for movement between two operative positions one of which is shown in FIGURE 3. A pair of vertically spaced plate members are therefore secured to the bottom of the hopper 12 including an upper loading plate member 34 and a lower discharge plate member 36. The plate members are maintained in spaced relation to each other by a plurality of spacer elements 38 as shown in FIGURE 2 so as to accommodate sliding movement of the shuttle bar 32 therebetween. The plate members 34 and 36 are respectively formed with a plurality of spaced apertures 40 and 42. While the apertures 40 and 42 are disposed in the same spacing arrangements on the respective plate members 34 and 36, they are non-aligned so that displacement of the shuttle bar 32 between its two operative positions will alternatively align the openings 44 formed therein with some of the apertures 40 or 42. The number of openings 44 and the spacing therebetween in the shuttle bar, is selected not only for alignment with either the apertures 40 or 42 but to also define the spaced outlet locations of the seed dispensing apparatus when the shuttle bar is in one of its two operative positions. In the position illustrated in FIGURE 3, the openings 44 are aligned with the apertures 40 in the loading plate so that they may receive a charge of seeds from the hopper thereabove when the closing bar 46 is disposed in its open position as shown in FIGURE 4. When the shuttle bar is then displaced to its other operative position as shown in FIGURE 5, the charge storing opening 44 will be aligned with the apertures 42 in the discharge plate member 36 in order to dispense the metered quantity of seeds 48.

It will be appreciated from the foregoing, that when the closing bar 46 is displaced from its open position as shown in FIGURES 4 and 5 to the closed position shown in FIGURE 3, flow of the seeds into the metering mechanism 30 will be blocked. Accordingly, the closing bar is provided with a plurality of inlet apertures 50 adapted to be aligned with each of the apertures 40 in the loading plate member 34 when the closing bar is in its open position. Further, the closing bar is held in engagement with the loading plate member and guided for sliding movement thereover by means of the spaced bar holder elements 52 as more clearly seen in FIGURES 1 and 3. The closing bar may be displaced between its open and closed positions by means of an actuating linkage including a lever member 54 connected by the link element 56 to the closing bar by means of the upstanding lugs 58 formed on the closing bar adjacent one end thereof. A bracket member 60 is also secured to one end of the hopper for pivotally mounting the lever member 54 while a positioning bracket 62 is mounted thereabove on the hopper having notches 64 within which the lever member 54 is received, corresponding to the two operative positions of the closing bar member 46.

It will be observed from FIGURES 1 through 3, that there are four outlet locations from which metered quantities of seeds are dispensed corresponding to the four seed storing openings 44 in the shuttle bar 32. Accordingly, at each of the outlet locations, one of the diverter sections 14 is located. It will however be appreciated that the number and spacing between the outlet locations must be varied in order to accommodate different types of bakery pans having dimensionally different spacings between dough receptacle portions. Apparatus utilizing four diverter sections as shown in FIGURES 1 through 3 may therefore be suitable for a baking pan within which hamburger buns are to be baked such as the baking pan 66 shown in FIGURE 8. It will therefore be apparent, that as the baking pan 66 is conveyed forwardly beneath the seed dispensing apparatus by the conveyor 68, metered quantities of seed will be deposited on four hamburger buns 70 simultaneously. So that the metered quantity of seed is deposited in a circular pattern on the buns, each diverter section includes a tubular member 72 which is circular in cross-section. Secured to the upper inlet end of the tubular member, is a downwardly converging funnel 74 into which the seeds are dispensed by the dispensing mechanism 30 as aforementioned. Mounted within the tubular member in spaced relation below the funnel is a downwardly curved screen 76 which centrally mounts an upwardly converging cone 78 aligned with the lower outlet end of the funnel 74. Accordingly, the seeds will be deflected by the cone and passed through the screen 76 for distribution in the circular pattern as aforementioned.

The upper inlet end of each diverter section is provided with a laterally extending flange portion 80 adapted to be seated against the lower side of the discharge plate member 36 with the tubular member 72 aligned with one of the openings 44 in the shuttle bar 32 at one of the outlet locations. The flange portion 80 is therefore provided with a pair of channel guides 82 slidably receiving the opposite longitudinal edge portions of the discharge plate member so that the diverter section may be slidably positioned in alignment with one of the outlet locations. The diverter section may then be locked in its proper position relative to the hopper by one of the spring biased latch devices 84 mounted on one longitudinal side of the hopper 12. Accordingly, one of the channel guides 82 is provided with a plurality of latch receiving notches 86.

Figures 6, 7:
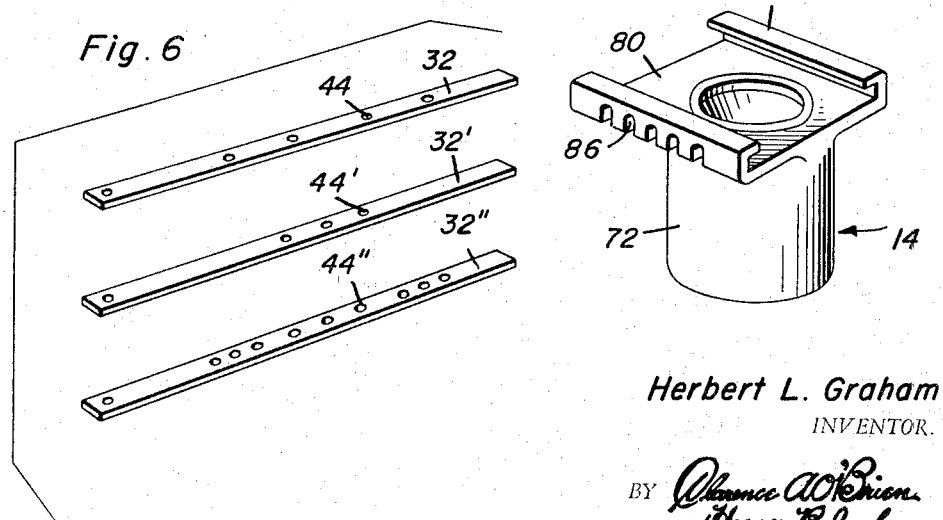
FIGURE 6 is a perspective view showing portions of the metering facilities associated with the seed dispensing device.
FIGURE 7 is a perspective view showing one form of a diverter section associated with the seed dispensing apparatus.
Figure 8:
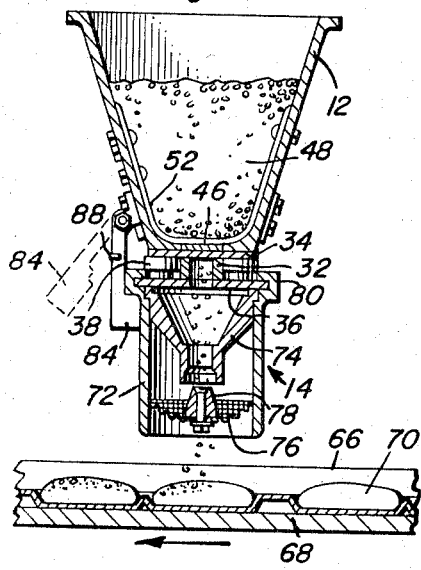
FIGURE 8 is a transverse sectional view taken substantially through a plane indicated by section line 8—8 in FIGURE 3.
Figure 9:
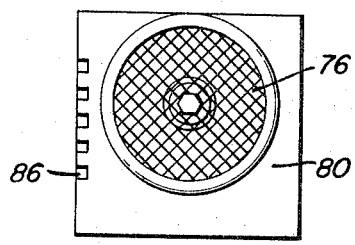
FIGURE 9 is a bottom plan view of the form of diverter section shown in FIGURE 7.
Figure 11:
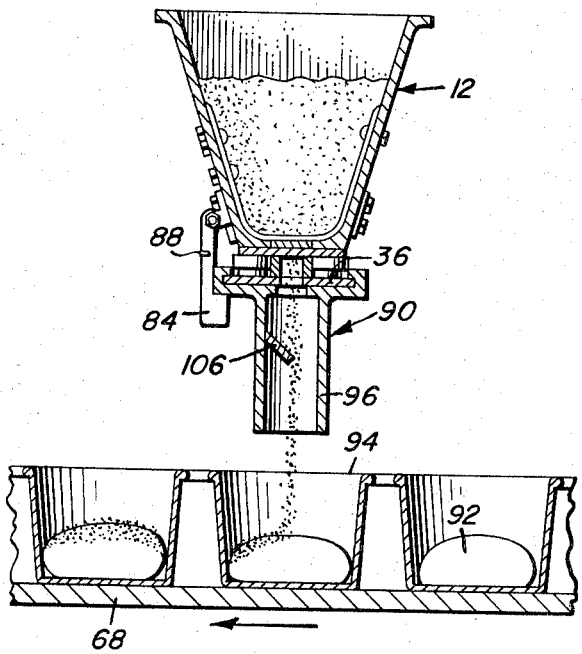
FIGURE 11 is a transverse sectional view taken substantially through a plane indicated by section line 11—11 in FIGURE 10.

To replace and change the diverter sections, the latch device 84 must be displaced against the bias of its spring element 88 to the dotted line position shown in FIGURE 8. The diverter sections may then be slidably removed from the discharge plate member 36 and replaced by another appropriate diverter section. Also, dependent upon the type of baking pan to be accommodated, the shuttle bar 32 may be replaced in order to provide storing openings different in number and spacing from those associated with the shuttle bar 32 hereinbefore described. FIGURE 6 accordingly illustrates two other shuttle bars 32′ and 32″. Where a shuttle bar 32′ is utilized having three openings 44′, a single diverter section 90 may be suitable as shown in FIGURES 10 through 12. The seed dispensing apparatus will then be arranged for depositing seeds in a longitudinal pattern onto elongated breads 92 contained within the bread pan 94 conveyed along the conveyor 68 as shown in FIGURE 11.

The diverter section 90 also includes a tubular member 96 which is, however, cross-sectionally elongated in one direction so as to be aligned with the three openings 44′ when the shuttle bar 32′ is displaced to the operative position to define three spaced outlet locations. The upper inlet end of the tubular member 96 is therefore provided with a flange portion 98 having an elongated inlet slot 100. Guide channels 102 are formed on the flange 98 for slidably receiving the discharge plate member 36. Thus, the diverter section 90 may be positioned at the proper location along the bottom of the hopper and locked in its position by one of the latch devices 84 received within the notch 104 formed in one of the guide channels 102. Also, a deflecting baffle member 106 is mounted within the tubular member 96 as shown in FIGURE 11 so that the seeds dispensed from the three outlet locations will be longitudinally distributed in the elongated pattern desired for the bakery products 92.

From the foregoing description, the construction, operation and utility of the seed dispensing apparatus of the present invention will be apparent. It will therefore be appreciated that the apparatus of the present invention is particularly useful in that it is capable of dispensing metered quantities of seeds simultaneously at a plurality of outlet locations. Also, the number and spacing of the outlet locations may be readily changed in accordance with different requirements together with the facilities for changing the seed distribution pattern.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a dispensing apparatus, a hopper containing particulate material, metering means movably mounted by the hopper intermittently dispensing predetermined quantities of said particulate material from fixedly spaced outlet locations along said hopper, at least one diverter slidably mounted by said hopper, and latch means operatively mounted by the hopper for locking engagement with said diverter in selected positions relative to said spaced outlet locations to receive and distribute the particulate material dispensed by the metering means, said diverter having means for distributing the particulate material in a predetermined pattern at a location corresponding to the selected position.

2. The combination of claim 1 wherein said metering means comprises a pair of vertically spaced plate members having non-aligned apertures therein, a reciprocating member movably mounted between said plate members having spaced charge storing openings alternatively aligned with the apertures in the plate members, said openings defining the spaced outlet locations when aligned with the apertures in one of the plate members, the diverter being slidably mounted by said one of the plate members for adjustable positioning thereof.

3. In a dispensing apparatus for depositing seed on bakery products or the like, a hopper containing particulate material, metering means movably mounted by the hopper intermittently dispensing predetermined quantities of said particulate material from spaced outlet locations along said hopper, at least one diverter removably mounted on said hopper, and latch means operatively mounted by the hopper for locking said diverter in a position aligned with said spaced outlet locations to receive the particulate material dispensed by the metering means, said diverter having means for distributing the particulate material in a predetermined pattern, said metering means comprising a pair of vertically spaced plate members having non-aligned apertures therein, a reciprocating member movably mounted between the plate members having spaced charge storing openings alternatively aligned with the apertures in the plate members, said openings defining the spaced outlet locations when aligned with the apertures in one of the plate members, the diverter being slidably mounted by said one of the plate members for adjustable positioning thereof, said diverter including a tubular member through which the particulate material is conducted, deflecting means mounted in the tubular member, a flange portion connected to an upper inlet end of the tubular member having guides slidably receiving said one plate member, said flange portion being formed with at least one notch receiving the latch means therein when the diverter is in said position aligned with the spaced outlet locations.

4. The combination of claim 3 wherein said deflecting means comprises, a funnel downwardly converging from the upper inlet end of the tubular member, a downwardly curved screen secured to the tubular member in spaced relation below the funnel, and an upwardly converging cone secured to the screen in alignment with the funnel.

5. In a dispensing apparatus for depositing seed on bakery products or the like, a hopper containing particulate material, metering means movably mounted by the hopper intermittently dispensing predetermined quantities of said particulate material from spaced outlet locations along said hopper, at least one diverter removably mounted on said hopper, and latch means operatively mounted by the hopper for locking said diverter in a position aligned with said spaced outlet locations to receive the particulate material dispensed by the metering means, said diverter having means for distributing the particulate material in a predetermined pattern, said diverter including a tubular member through which the particulate material is conducted, deflecting means mounted in the tubular member, a flange portion connected to an upper inlet end of the tubular member, said flange portion being formed with at least one notch receiving the latch means therein when the diverter is in said position aligned with the spaced outlet locations.

6. The combination of claim 5 wherein said tubular member is cross-sectionally elongated in one direction for alignment with all of said spaced outlet locations, said deflecting means including an elongated baffle member longitudinally distributing the particulate material along said one direction.

7. The combination of claim 1 including closing means movably mounted within the hopper for displacement to a closing position blocking flow of the particulate material into the metering means.

8. The combination of claim 7 wherein said metering means comprises a pair of vertically spaced plate members having non-aligned apertures therein, a reciprocating member movably mounted between said plate members having spaced charge storing openings alternatively aligned with the apertures in the plate members, said openings defining the spaced outlet locations when aligned with the apertures in one of the plate members, said closing means including a closing bar, and means for selectively displacing said closing bar to said closing position from an open position, said closing bar having inlet apertures aligned with the apertures in the other of the plate members in the open position of the closing bar.

9. In a dispensing apparatus for depositing seed on bakery products or the like, a hopper containing particulate material, metering means movably mounted by the hopper intermittently dispensing predetermined quantities of said particulate material from spaced outlet locations along said hopper, at least one diverter removably mounted on said hopper, and latch means operatively mounted by the hopper for locking said diverter in a position aligned with said spaced outlet locations to receive the particulate material dispensed by the metering means, said diverter having means for distributing the particulate material in a predetermined pattern, closing means movably mounted within the hopper for displacement to a closing position blocking flow of the particulate material into the metering means, said metering means comprising a pair of vertically spaced plate members having non-aligned apertures therein, a reciprocating member movably mounted between said plate members having spaced charge storing openings alternatively aligned with the apertures in the plate members, said openings defining the spaced outlet locations when aligned with the apertures in one of the plate members, said closing means including a closing bar, and means for selectively displacing said closing bar to said closing position from an open position, said closing bar having inlet apertures aligned with the apertures in the other of the plate members in the open position of the closing bar, said diverter including a tubular member through which the particulate material is conducted, deflecting means mounted in the tubular member, a flange portion connected to an upper inlet end of the tubular member having guides slidably receiving said one plate member, said flange being formed with at least one notch receiving the latch means therein when the diverter is in said position aligned with the spaced outlet locations.

10. The combination of claim 1 wherein said diverter is provided with at least one notch receiving the latch means in the selected position of the diverter, said diverter including a tubular member through which the particulate material is conducted in adjustably spaced relation to the outlet locations.

11. The combination of claim 1, wherein said diverter includes a tubular member through which the particulate material is conducted, deflecting means mounted in the tubular member, a flange portion connected to an upper inlet end of the tubular member, said flange portion being formed with at least one notch receiving the latch means therein when the diverter is in said selected positions relative to the spaced outlet locations.

References Cited by the Examiner

UNITED STATES PATENTS

| | | | |
|---|---|---|---|
| 9,373 | 11/1852 | Trevitt | 222—485 X |
| 225,528 | 3/1880 | Lutz | 222—276 X |
| 225,940 | 3/1880 | McCrodden | 141—244 X |
| 760,435 | 5/1904 | Draver | 222—461 X |
| 1,343,924 | 6/1920 | McCorkle | 222—276 X |
| 2,507,269 | 5/1950 | Quayle | 141—244 X |

ROBERT B. REEVES, *Primary Examiner.*

F. R. HANDREN, *Assistant Examiner.*